United States Patent
Mackerle

[15] 3,672,458

[45] June 27, 1972

[54] DRIVER WHEEL OF VEHICLE

[72] Inventor: Julius Mackerle, Prague, Czechoslovakia

[73] Assignee: Ustav pro vyzkum motorovych vozidel, Prague, Czechoslovakia

[22] Filed: Feb. 16, 1970

[21] Appl. No.: 11,411

[30] Foreign Application Priority Data

Feb. 17, 1969 Czechoslovakia..................1058/69

[52] U.S. Cl.............................................180/8 F, 180/66 B
[51] Int. Cl.......................................................B62d 57/02
[58] Field of Search.....................................180/8, 8 F, 66 B

[56] References Cited

UNITED STATES PATENTS

| 574,200 | 12/1896 | Goddard | 180/8 F |
|---|---|---|---|
| 3,194,180 | 7/1965 | Mackerle | 180/66 B X |

Primary Examiner—Leo Friaglia
Attorney—Richard Low and Murray Schaffer

[57] ABSTRACT

A self-propelled driver wheel for a vehicle comprising a plurality of linearly expandable spokes uniformly arranged about a central hub, each spoke being separately joined to a supply of fluid under pressure and being provided with distributor means for selectively distributing the fluid to the spokes whereby on expansion thereof the wheel is caused to turn.

7 Claims, 8 Drawing Figures

INVENTOR
JULIUS MACKERLE

PATENTED JUN 27 1972   3,672,458

JULIUS MACKERLE
INVENTOR

BY
ATTORNEY

DRIVER WHEEL OF VEHICLE

BACKGROUND OF INVENTION

The present invention relates to power mechanism for vehicles and in particular to a driver wheel propelled by pneumatic or hydraulic actuation of a series of circularly arranged cylinder and piston assemblies.

In my copending application Ser. No. 8,562 filed Feb. 4, 1970 based on Czechoslovak application PV 775-69 filed Feb. 6, 1969, there is disclosed a drive wheel for vehicles generally referred to as a driver which is provided with a series of independent spacially non-communicating chambers of variable volume. Each of these chambers are separately joined by a distributor and control mechanism in a central hub to a supply of compressed gas. The gas working medium is supplied to the chambers in such a manner that the resultant of the pressures in the contact surface of the driver with the ground lies during travelling outside a perpendicular plane passing through the axis of the hub.

In the embodiments of a driver, shown in the aforementioned patent, the gas chambers are formed of a deformable resilient material, particularly rubber. Such an embodiment is not suitable for many applications, particularly if the chambers are exposed to the danger of damage by various mechanical, physical, chemical and similar harmful effects, which may be found if the wheels are used to drive over the road vehicles.

The objects of the present invention are to eliminate these drawbacks.

SUMMARY OF INVENTION

In accordance with the present invention a self-propelled driver wheel for a vehicle is provided comprising a plurality of linearly expandable spokes uniformly arranged about a central hub, each spoke being separately joined to a supply of fluid under pressure and being provided with distributor means for selectively distributing the fluid to the spokes whereby on expansion thereof the wheel is caused to turn.

In the preferred form the spokes comprise a cylinder and piston assembly, pivoted at their respective ends to the hub and rim of the wheel. The rim is preferably a flexible band which is deformable on actuation of the cylinder and piston assemblies to provide the propelling motion.

Full details of the present invention together with a full explanation of the objects and advantages will be found in the following description where reference is made to the accompanying drawings.

DESCRIPTION OF THE INVENTION

Figure 1:
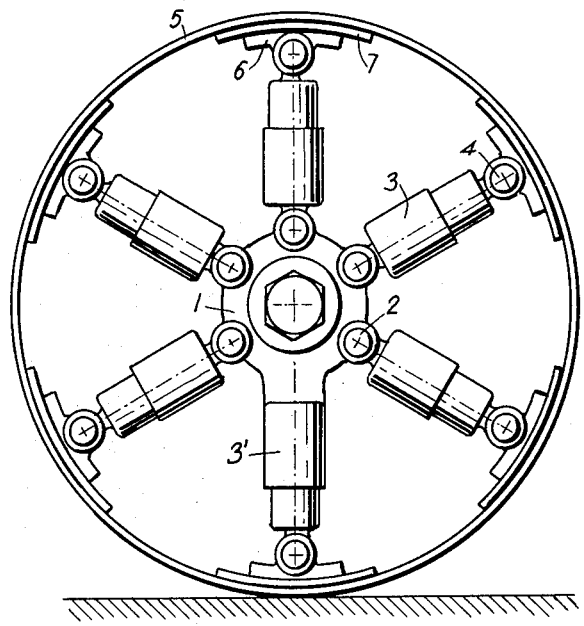
FIG. 1 is a side elevational view of the driver in accordance with one embodiment of the present invention.
Figure 2:
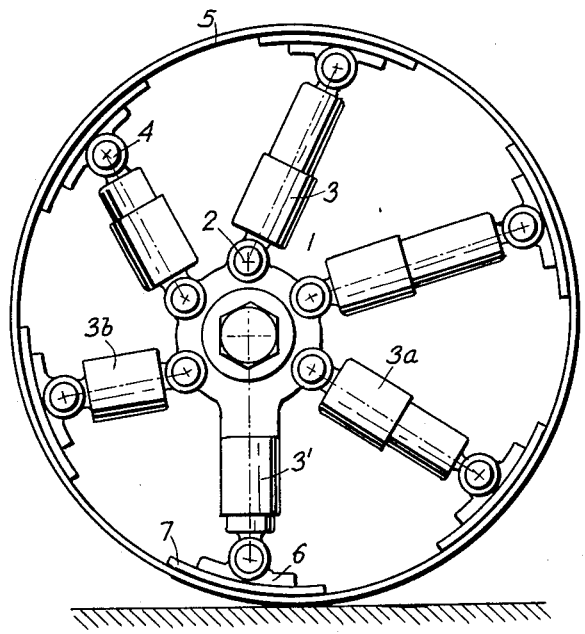
FIG. 2 is a view similar to FIG. 1, showing the driver in an eccentric position.

Referring now more particularly to the embodiment shown in FIGS. 1 and 2, the vehicle driver consists of a plurality of symmetrically radially arranged hydraulic or pneumatic cylinders 3 (six are shown) each having a piston pivotally jointed at one end by means of pins 4, lugs 6, and reinforcement shims 7 to a circular hoop or rim 5. The cylinder 3 is pivotally joined by means of pins 2 to a central wheel hub 1 rotatably supported on a non-rotating axle of the vehicle. Preferably the rim 5 is resilient or spring like steel band. The shims 7 are also resilient, but may be steel, rubber or plastic. The hub 1 is provided internally with a distributor and control means for supplying the fluid or gaseous working medium.

The distributor and control means may be similar in structure and function to that shown in my aforementioned application which briefly comprises a pneumatic or hydraulic pump and valve means for successively feeding pressurized fluid to the working chambers. To maintain this disclosure brief such structure as is disclosed in that application is incorporated herein as if more fully set forth for which all legal and equitable benefits are claimed.

Figure 6:
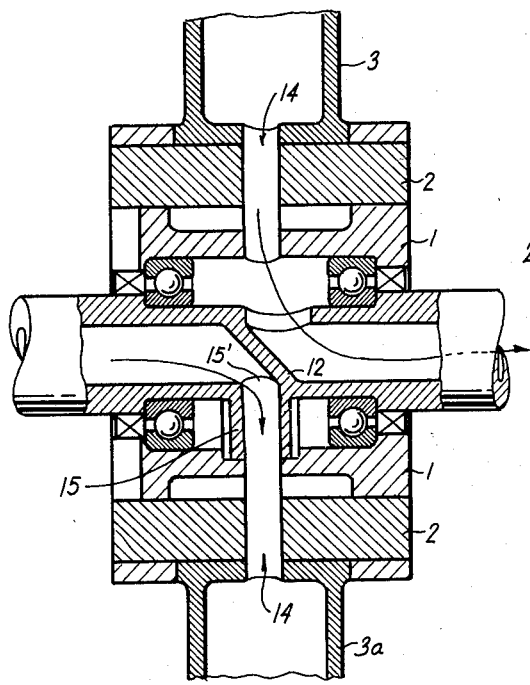
FIG. 6 is a longitudinal section through the wheel hub showing the control on the distributor mechanism.

According to the disclosure of the aforementioned application, the present driver wheel, as seen in detail in FIG. 6, may have its hub mounted about a non-rotatable hollow axle which is provided with an interior wall 12 dividing it into an inlet side and an outlet side (right and left respectively as seen in the figure). The axle is provided with radial openings 13 communicating with ducts 14 leading to the lower and upper positions of the cylinder 3, the ducts 14 are provided through the hub and corresponding pivot spindles 2 for each of the cylinders. Surrounding the axle is a slide valve mechanism 15 which is connected by appropriate linkages (not shown) to the operator's position or driver's seat of the vehicle. Compressed air from a suitable source such as a pump or resevoir conveniently mounted on the vehicle, is fed through the inlet of the axle. Since cylinders 3 replace the globes of the aforementioned application the compressed air moves into successive cylinders 3 following the arrow into each so that they may be pressurized. As the wheel turns and the cylinders move about the fixed axle until the pressurized cylinder reaches the upper position wherein the air is discharged through the outlet of the axle as shown by the arrow. Thus, the cylinders may be sequentially pressurized and depressurized so as to perform the operation described hereinafter. On the other hand the present device is suitable for use with a fixed supply of pressurized fluid, as might be contained in a given volumetric reservoir or tank and which is provided with distributor and control means for simultaneously supplying and relieving (i.e. bleeding) the pressurized fluid to and from the cylinders in selective successive combinations.

Each of the cylinders assemblies 3 is made out of a strong material such as steel or other metals and act, not only as the motive means for the wheel, but as the supporting spokes of the wheel. The cylinders 3 are uniformly and symmetrically spaced about the hub 1, each being independent of the other and forming non-communicating chambers of variable volume. The pistons extending from each may therefore be selectively actuated and extended to varying lengths, as desired.

One of the cylinders 3' is of predetermined length and is fixedly connected to the wheel hub 1 and serves as a fixed length spoke for the wheel. So as to provide a fixed reference establishing the permanently correct relative positions for all the cylinders 3, the hub 1, and the rim 5 in the tangential direction in any rotating or working position. Establishment of the correct relative position of the rim 5 with respect to the axial direction of hub 1, and of the parallel direction of the axis of the rim 5 is accomplished by all of cylinders 3 acting jointly and in combination. All of the pivot pins 2 and 4 are parallel with the wheel axis.

Due to the fact that the wheel rim 5 is made of a resilient band, it can be radially distorted or deformed to a certain extent under effect of the pressure of the working medium in the cylinder assemblies 3 into a suitable oval shape. Thus, its contact surface with the ground is extended (to form a contact foot) beyond a perpendicular plane to the ground passing through the axis of the hub 1 and the driving moment of the wheel may be increased. By a suitable selection of the degree of resilience of the steel band, by suitably timing the supply of the working medium, and by selectively choosing the number of cylinders 3 it is possible to achieve a very favorable foot or oval shape in the rim 5, and thus also a large driving moment of the driver.

The driver in accordance with FIGS. 3–6 comprises a plurality of radially arranged metallic cylinder assemblies 3 (four are shown) pivotally jointed in the same manner as in the embodiment shown in FIGS. 1 and 2, to the rim 5 and to the hub 1. Each of the cylinder assemblies 3 are provided with the same types of distributor or control mechanism as in the case of the driver in accordance with FIGS. 1 and 2. However, this embodiment differs from the previous one in that none of the cylinders is fixed to the hub 1 or rim 5. Instead a pair of linked guiding arms 9 and 11 is provided, bridging across each cylinder assembly to secure the correct position of the rim 5 with respect to the axial direction of hub 1 and the parallel direction of the axis of the rim 5 and the axis of the hub 1 without preventing free expansion and contraction of the cylinders 3. The guiding arms 9 and 11 are formed in paired parallel arrangement and are pivotally jointed together by means of a pin 10 and are pivotally jointed to the hub 1 by means of a pin 8, and to the rim 5 by means of the pivot pin 4' coaxial with the pivot pin 4 which joins the air cylinders 3 to the rim 5.

In order to permit all cylinders 3 to be produced alike, one of the internal guiding arms 9' is fixedly connected with the wheel hub 1. Thus is established the correct relative position and fixed reference length position of all cylinders 3, the hub 1 and the rim 5 in the tangential direction, when in rotating working positions, without modification of the cylinders 3 themselves. All pins 2, 4, 8, and 10 are parallel with the wheel axis, as in the earlier embodiment.

Figure 3:
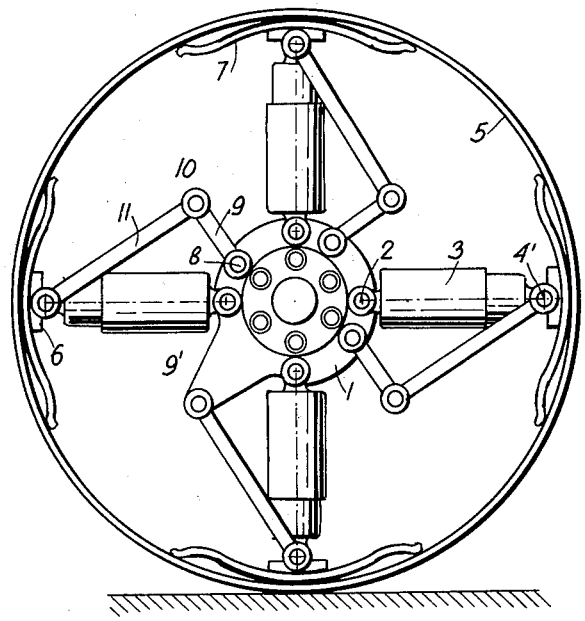
FIG. 3 is a side elevational view of a second embodiment.
Figure 5:
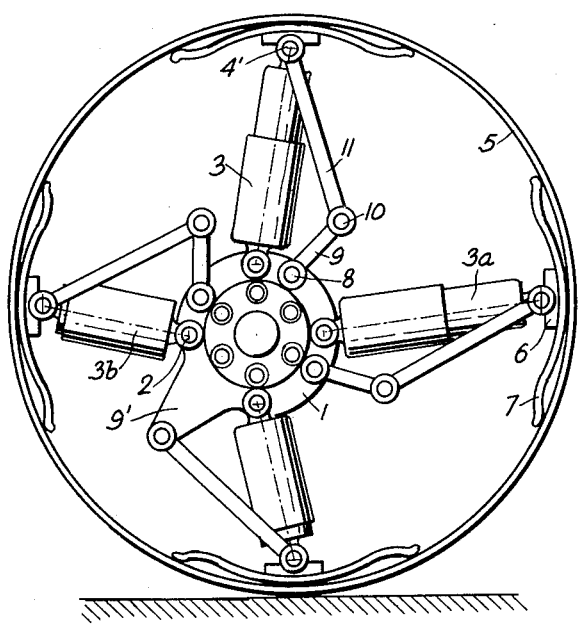
FIG. 5 is a side elevational view of the driver shown in FIG. 3 in an eccentric position.

As seen in FIGS. 3 and 5 the shim 7 of this second embodiment is elongated and has a corrugated cross-section. This structure provides added support and strength for the rim 5.

The vehicle driver of both embodiments operates in the following manner.

In the normal position indicated in FIG. 1 and FIG. 3 all of the cylinders 3 or 3' are uniformly pressurized or filled with a working fluid and consequently the extending pistons are of the same length. In this condition, when the fluid is neither supplied into nor let out from the cylinder assemblies or are static pressurization, the rim 5 is concentric with the hub 1, and if it were lifted, the driver would be freely rotatable about the fixed axle. In such a condition a plane perpendicular to the ground passes through the hub 1. However, as soon as the control mechanism located in the hub 1 is adjusted so that working fluid begins to flow into cylinder 3a located to right and to the rear of the perpendicular plane and/or to flow out of the cylinder 3b located to the left and in front of the perpendicular plane (i e: into the reservoir, or into the pump) the hub 1 is pressed away with respect to the rim 5, or taken out of the central position as seen in FIGS. 2 and 5. Due to the fact that the wheel loading at the place of contact of the rim 5 with the ground is operative only beyond the perpendicular plane passing through the axis of the hub 1, there is produced a driving moment and the vehicle is driven forward. After the driver has turned through the angular distance between the cylinders 3, that is through 60° in the case of the first example of embodiment, and through 90° in the case of the second example of embodiment, the control mechanism in the hub 1 connects the supply of pressure liquid into the next successive cylinder 3 which has reached the position 3a. At this time the whole process is repeated, and the vehicle continues its forward travel. Reverse movement can be effected by reversing the sequency of applying the pressurized fluid.

The described two examples of embodiment explain only the principle of the invention which may be actually embodied differently as a whole, or in its various details. For example. It is possible to use as working medium a liquid such as oil or gas such as air. It is possible by conventional arrangement and adjustment of the control mechanism in the hub 1 to achieve efficient and effective expansion and compression in the cylinder 3, and thus to obtain efficient operation of the drive. In addition, gas resilience in the cylinders 3 assists springing and shock absorbtion of the vehicle.

Figure 7:
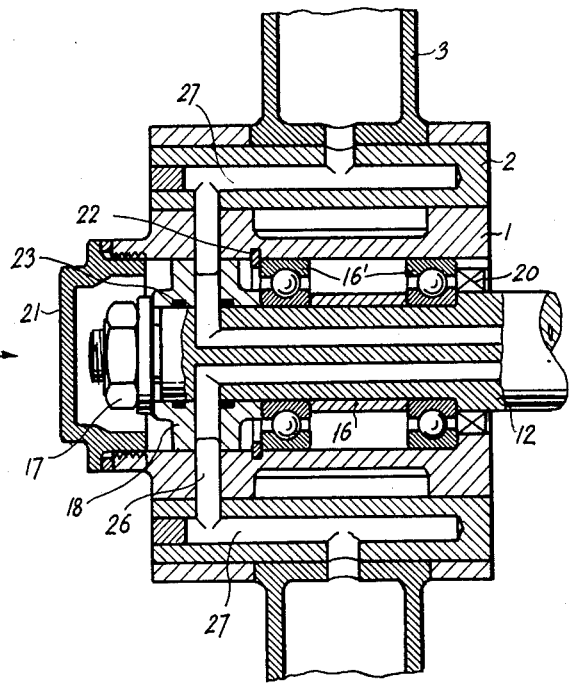
FIG. 7 is a view similar to that of FIG. 6 showing an alternate control end distributor mechanism.
Figure 8:
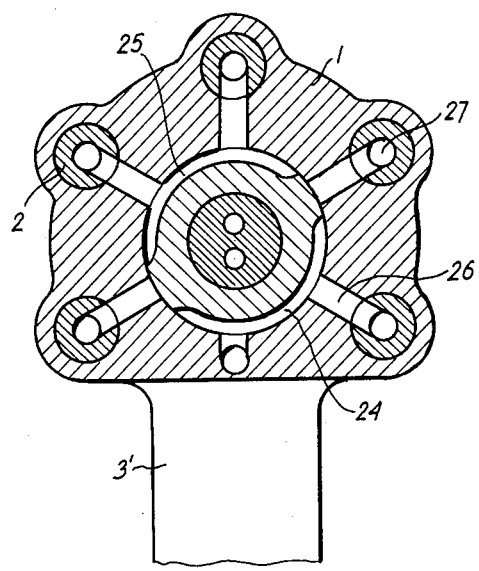
FIG. 8 is a transverse section of a portion of FIG. 7.

In addition to the techniques specifically shown in the aforementioned patent for delivering the working fluid to the cylinders or chambers, the supply can be accomplished, as seen in FIG. 7 by making each pivot pin 2 hollow and by feeding the fluid to it through a pair of inlet and outlet ducts situated at the end of the non-rotating axle or through a separate flexible hose. Referring to FIGS. 7 and 8, hub 1 is mounted on the stationary axle of wheel 12 on two rolling-contact bearings 16 attached to the pin by a nut 17 over an insert of the control mechanism 18 and a spacer tube 19. The inner space of the hub of the wheel is sealed against the external space by seal 20 and closing nut 21. The outer bearing is attached to the wheel hub by a spacer ring 22. The control mechanism is rigidly connected with the pin of wheel 12 and sealed by O rings 23. On the periphery of the control mechanism there are grooves 24 and 25 securing a correct supply of the pressure medium into the respective cylinders through bore 26 in the eye of the wheel hub and through duct 27 in the hollow pin 2.

At least three metal cylinders 3 are required. However, the greater the number, the more uniform will be the characteristic of the driving moment.

The term "metal cylinder" used in this specification not only refers to the classical embodiment of a cylinder and a piston, piston rod and seals but also to all other technically equivalent solutions, for example a rolling-contact diaphragm in a metal cover, resilient metal bellows, and similar known mechanism preventing leaks of the seals.

Instead of a resilient rim 5 a rigid rim may also be used on which there may be mounted a normal pneumatic or anti-slide mechanism, tire or the like. In order to eliminate the necessity of lubricating the pivot pins of the pairs of guiding arms 9 and 11, it is possible to secure the correct axial position of the rim 5 with respect to the hub 1 and the parallel direction of the axis of the rim 5 with the axis of the hub 1 in another known method of guiding, for example by means of a resilient bent steel band, a link guide, and the like.

Numerous advantages will be apparent from the preceeding description.

Figure 4:
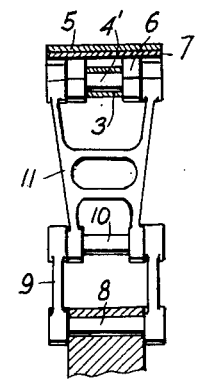
FIG. 4 is a development in elevation of the guiding arm, employed in the embodiment of FIG. 3.

The rigid connection of one of the metal cylinders with the wheel hub secures a permanent and reliable correct position of all cylinders. It also secures the positioning of the hub and the rim in a tangential direction in all operating positions. In a driver provided with guiding arms, as seen in FIGS. 3–5, the firm connection of one of the internal guiding arms with the wheel hub permits all cylinders to be relatively locked in the same manner.

Pivotal joining of the outer guiding arms to the axis of the pins which also secure the metal cylinders to the rim permits saving of material, production costs and the weight of the driver.

The arrangement of resilient shims at the pivotal joints provides any required reinforcement of the wheel rim.

Arranging the wheel rim with such a degree of resilience in the radial direction that it can be deformed by the operational pressure of the metal cylinders into an oval shape yields the advantage that the center of the contact surface of the rim with the ground is further moved from the perpendicular plane passing through the axis of the wheel hub.

What is claimed is:

1. In a vehicle, a driver wheel comprising a circular rim, a hub, a plurality of radially expandable spokes, each of which comprises a cylinder and piston assembly, one of said cylinder assemblies being of predetermined length and being securely fixed at its ends to said rim and said hub respectively, the remaining cylinder and piston assemblies being pivotally jointed to said rim and said hub and arranged uniformly about said wheel, each of said cylinders being separately connected to a supply of fluid under pressure, said wheel being provided with distributor means for selectively supplying fluid to said cylinders to expand the same when said cylinders respectively lie outside of a plane perpendicular to the ground and passing through the axis of said hub, whereby on expansion thereof the wheel is caused to turn.

2. The driver according to claim 1 including a supporting shim mounted between said cylinder assemblies and said rim.

3. The driver according to claim 1, wherein said rim is resilient and is deformable in a radial direction on actuation of said cylinder assemblies.

4. The driver according to claim 1, wherein said hub is freely mounted about a fixed axle.

5. The driver according to claim 1, wherein said cylinder assemblies are metallic and support said wheel.

6. The driver according to claim 1, wherein said supply of fluid under pressure is obtained from a compressor pump.

7. The driver according to claim 1, wherein said supply of fluid under pressure is stored in a fixed volumetric reservoirs, and is fed and withdrawn alternately from selected spokes.

* * * * *